US012009130B2

(12) United States Patent
Shitama et al.

(10) Patent No.: US 12,009,130 B2
(45) Date of Patent: Jun. 11, 2024

(54) REACTOR

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Seiji Shitama, Yokkaichi (JP); Akinori Ooishi, Yokkaichi (JP); Kohei Yoshikawa, Yokkaichi (JP); Naotoshi Furukawa, Yokkaichi (JP); Kazuhiro Inaba, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 510 days.

(21) Appl. No.: 17/295,651

(22) PCT Filed: Nov. 27, 2019

(86) PCT No.: PCT/JP2019/046466
§ 371 (c)(1),
(2) Date: May 20, 2021

(87) PCT Pub. No.: WO2020/111160
PCT Pub. Date: Jun. 4, 2020

(65) Prior Publication Data
US 2022/0005641 A1 Jan. 6, 2022

(30) Foreign Application Priority Data
Nov. 29, 2018 (JP) ................................ 2018-224282

(51) Int. Cl.
*H01F 17/04* (2006.01)
*H01F 27/02* (2006.01)
(Continued)

(52) U.S. Cl.
CPC ............ *H01F 27/02* (2013.01); *H01F 27/24* (2013.01); *H01F 27/2823* (2013.01)

(58) Field of Classification Search
CPC ...................................................... H01F 27/02
(Continued)

(56) References Cited

U.S. PATENT DOCUMENTS

| | | | |
|---|---|---|---|
| 10,916,365 | B2 | 2/2021 | Shitama et al. |
| 2020/0035398 | A1 | 1/2020 | Hirabayashi et al. |

FOREIGN PATENT DOCUMENTS

| | | | |
|---|---|---|---|
| JP | 2010-045112 | A | 2/2010 |
| JP | 2013-243211 | A | 12/2013 |

OTHER PUBLICATIONS

International Search Report, Application No. PCT/JP2019/046466, dated Feb. 18, 2020. ISA/Japan Patent Office.

*Primary Examiner* — Ronald Hinson
(74) *Attorney, Agent, or Firm* — Honigman LLP

(57) ABSTRACT

A reactor includes: a coil including a pair of winding portions arranged in parallel via a coupling portion; a magnetic core including inner core portions arranged inside the winding portions and a pair of outer core portions arranged outside the winding portions; a pair of holding members arranged so as to face end faces of the winding portions; and a molded resin portion covering at least a portion of outer peripheral surfaces of the outer core portions and fills spaces between inner peripheral surfaces of the winding portions and the inner core portions. The coil is a single continuous winding wire, the coupling portion is formed by bending back a portion of the winding wire, and
(Continued)

one of the holding members on a side on which the coupling portion is arranged includes a recessed portion housing the coupling portion and an inward projection is arranged inside the coupling portion.

8 Claims, 5 Drawing Sheets

(51) Int. Cl.
*H01F 27/24* (2006.01)
*H01F 27/28* (2006.01)

(58) Field of Classification Search
USPC .......................................................... 336/221
See application file for complete search history.

REACTOR

CROSS-REFERENCE TO RELATED APPLICATIONS

This application is the U.S. national stage of PCT/JP2019/046466 filed on Nov. 27, 2019, which claims priority of Japanese Patent Application No. JP 2018-224282 filed on Nov. 29, 2018, the contents of which are incorporated herein.

TECHNICAL FIELD

The present disclosure relates to a reactor.

BACKGROUND

JP 2017-28142A discloses a reactor that includes a coil having winding portions formed by winding a winding wire, a magnetic core that is arranged extending inside and outside the winding portions and forms a closed magnetic circuit, and end intervening members that are interposed between outer core portions and end faces of the winding portions. The magnetic core includes inner core portions that are arranged inside the winding portions and outer core portions that are arranged outside the winding portions. Also, the reactor described in JP 2017-28142A includes an inner resin portion that fills the spaces between the inner peripheral faces of the winding portions and the outer peripheral faces of the inner core portions, and an outer resin portion that integrates the outer core portions with the end intervening members. The end intervening members include resin filling holes for filling the interiors of the winding portions with the resin that forms the inner resin portion. The outer resin portion and the inner resin portion are connected to each other through the resin filling holes.

JP 2010-45112A discloses a coil that includes a pair of winding portions that are obtained by winding a single continuous winding wire and are arranged in parallel. The two winding portions are connected via a coupling portion, which is a portion of the winding wire that has been bent back. The coupling portion is formed by bending back the winding wire into a hairpin shape at one end side of the two winding portions, and connects the end portions of the winding portions to each other.

In the reactor described in JP 2017-28142A, the outer peripheral faces of the outer core portion are covered with resin, and the resin passes through the resin filling holes formed in holding members such as the end intervening members and fills the spaces between the winding portions and the inner core portions from the end face side of the winding portions. In this way, the molded resin portions including the outer resin portion and the inner resin portion are formed as a single body.

As described in JP 2010-45112A, in the case of a coil that has a pair of winding portions that are formed by a single continuous winding wire and are arranged in parallel via a coupling portion, consideration has been given to applying such a coil to a reactor that includes the above-described molded resin portion. The aforementioned coil, which is formed by a single continuous winding wire, has the coupling portion that is formed by bending back the winding wire. On one end side of the two winding portions, the coupling portion projects from the end faces of the winding portions in the axial direction of the winding portions. A space is formed between the coupling portion and the end faces of the winding portions, that is to say inside the coupling portion. Hereinafter, this space will sometimes be called the “interior space of the coupling portion”. When the above-described coil is to be used, in order to prevent the coupling portion from interfering with the holding member, it is conceivable to reduce the thickness of a portion of the holding member that is located on the side where the coupling portion is arranged.

One example of a method for manufacturing a reactor that includes the above-described molded resin portion is resin molding in which an assembly that includes a coil, a magnetic core, and holding members is placed in a mold, and resin is then injected into the mold. Accordingly, the outer core portion is covered with the resin, and the resin passes through the resin filling holes in the holding members and fills the spaces between the winding portions and the inner core portion, thus molding the molded resin portion.

Generally, when the resin is injected into the mold, pressure is applied to the resin through injection molding, and the applied pressure needs to be high in order for the resin to sufficiently spread through narrow gaps between the winding portions and the inner core portion. For this reason, when the molded resin portion is molded, the holding members attempt to bulge outward due to the pressure of the resin. In particular, if the thickness of the holding member located on the side corresponding to the coil coupling portion is reduced in order to prevent interfering with the coupling portion, the strength of that portion decreases. For this reason, the reduced-thickness portion of that holding member can easily deform during molding of the molded resin portion, and there is a risk of becoming damaged in some cases. If the holding member deforms a large amount and becomes damaged, resin may leak from the space between the holding member and the end faces of the winding portions.

In view of this, an object of the present disclosure is to provide a reactor that can suppress the leakage of resin caused by deformation of the holding member when the molded resin portion is molded.

SUMMARY

A reactor according to one aspect in the present disclosure includes a coil including a pair of winding portions arranged in parallel via a coupling portion; and a magnetic core including inner core portions arranged inside the winding portions and a pair of outer core portions arranged outside the winding portions. The reactor further includes a pair of holding members arranged so as to face end faces of the winding portions; and a molded resin portion that covers at least a portion of outer peripheral surfaces of the outer core portions and fills spaces between inner peripheral surfaces of the winding portions and the inner core portions, wherein the coil is constituted by a single continuous winding wire, the coupling portion is formed by bending back a portion of the winding wire, and one of the holding members on a side on which the coupling portion is arranged includes a recessed portion that houses the coupling portion and an inward projection that is arranged inside the coupling portion.

Advantageous Effects of the Present Disclosure

A reactor according to an aspect of the present disclosure can suppress the leakage of resin caused by deformation of a holding member when a molded resin portion is molded.

DETAILED DESCRIPTION OF PREFERRED EMBODIMENTS

Figure 1:
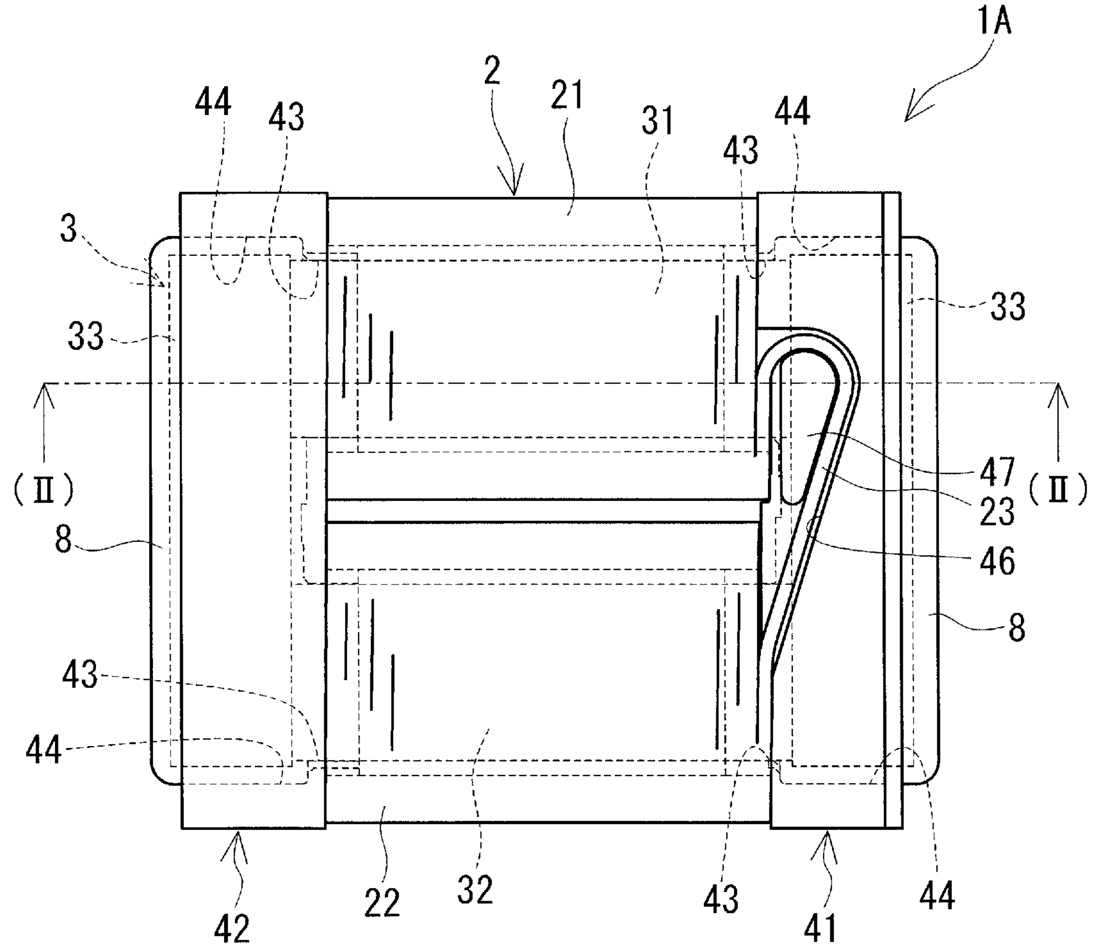
FIG. 1 is a schematic top view of a reactor according to a first embodiment.

The inventors of the present disclosure investigated providing the holding member located on the side corresponding to the coupling portion with a recessed portion that forms a space for accommodating the coupling portion in order to prevent the coupling portion of the coil from interfering with the holding member. In this case, the portion of the holding member where the recessed portion is formed is thin and has a low strength, and therefore the portion where the recessed portion is formed easily deforms during molding of the molded resin portion. In order to suppress deformation of the holding member during molding of the molded resin portion, it is conceivable to integrally provide a projection on an inner face of the mold such that the projection fits into the interior space of the coupling portion. During molding of the molded resin portion, the end face of the projection provided in the mold comes into contact with the bottom face of the recessed portion formed in the holding member, and the bottom face of the recessed portion is supported by the end face of the projection, thus suppressing deformation of the portion where the recessed portion is formed. However, in general, the winding portions of the coil, which is formed by winding a winding wire, are likely to have variation in their axial length. For this reason, the lengths of the winding portions are different in each coil, and therefore the position of the coupling portion in the axial direction may vary, and the position of the holding member relative to the mold may also vary. Accordingly, even if the aforementioned projection is provided in the mold, it is necessary to set the size of the projection relatively smaller than the interior space of the coupling portion in order for the projection to reliably enter the interior space of the coupling portion when the assembly is disposed in the mold. In other words, the area of the projection is set smaller than the area of the recessed portion of the holding member. Reducing the size of the projection also reduces the area of contact between the end face of the projection and the bottom face of the recessed portion of the holding member, thus making it difficult to sufficiently support with the bottom face of the recessed portion with the end face of the projection. Accordingly, there is a possibility of not being able to sufficiently suppress deformation of the portion of the holding member where the recessed portion is formed.

As one proposal made by the inventors of the present disclosure, an inward projection for arrangement in the interior space of the coupling portion is integrally provided in the recessed portion for accommodating the coupling portion in the holding member located on the side corresponding to the coupling portion of the coil. Providing this inward projection makes it possible to reduce the size of the reduced-thickness portion of the holding member where the recessed portion is formed. This therefore makes it possible to increase the strength of the portion of the holding member where the recessed portion is formed. Accordingly, it is possible to suppress deformation of the portion of the holding member where the recessed portion is formed during molding of the molded resin portion, and to suppress the leakage of resin caused by deformation of the holding member.

First, embodiments of the present disclosure will be listed and described.

(1) A reactor according to an embodiment of the present disclosure includes: a coil including a pair of winding portions arranged in parallel via a coupling portion; a magnetic core including inner core portions arranged inside the winding portions and a pair of outer core portions arranged outside the winding portions; a pair of holding members arranged so as to face end faces of the winding portions; and a molded resin portion that covers at least a portion of outer peripheral surfaces of the outer core portions and fills spaces between inner peripheral surfaces of the winding portions and the inner core portions, wherein the coil is constituted by a single continuous winding wire, the coupling portion is formed by bending back a portion of the winding wire, and one of the holding members on a side on which the coupling portion is arranged includes a recessed portion that houses the coupling portion and an inward projection that is arranged inside the coupling portion.

According to this reactor of the present disclosure, the one holding member on the side where the coupling portion of the coil is arranged includes the inward projection in the recessed portion for housing the coupling portion. Due to the inward projection, it is possible to reduce the size of the region where the thickness is reduced due to the portion where the recessed portion is formed. This therefore makes it possible to increase the strength of the portion of the holding member where the recessed portion is formed. Accordingly, it is possible to suppress deformation of the portion of the holding member where the recessed portion is formed during molding of the molded resin portion. This reactor of the present disclosure can suppress the leakage of resin caused by deformation of a holding member when a molded resin portion is molded.

Also, according to this reactor of the present disclosure, even if the axial position of the coupling portion changes depending on the coil, the size of the inward projection of the holding member does not need to be changed. For this reason, the inward projection can have a size and shape that corresponds to the interior space of the coupling portion. Accordingly, it is easier to ensure the strength of the portion where the recessed portion is formed. As described above, in the case where a projection provided on a mold is fitted into the interior space of the coupling portion, the assembly, which includes the coil, the magnetic core, and the holding member, is placed in the mold. At this time, it is difficult to prevent variation in the position of the coupling portion in the assembly that is made up of multiple members. Accordingly, the size of the projection needs to be reduced relative to the interior space of the coupling portion. However, the inward projection provided on the holding member need only be fitted into the interior space of the coupling portion, and the inward projection can be easily fitted into the coupling portion even if the inward projection is large. Accordingly, there is no need to change the size of the inward projection, and it is also possible to easily ensure the size of the inward projection relative to the interior space of the coupling portion.

(2) In an aspect of the above-described reactor, in plan view of a face of the one holding member on a recessed portion side, a ratio of the area of the inward projection to the area of the recessed portion is greater than or equal to 50%.

According to the above aspect, the ratio of the area of the inward projection to the area of the recessed portion is greater than or equal to 50%, thus making it possible to further improve the strength of the portion of the holding member where the recessed portion is formed. Accordingly, it is possible to further suppress deformation of the portion of the holding member where the recessed portion is formed during molding of the molded resin portion.

(3) In an aspect of the above-described reactor, at a face of the one holding member on a recessed portion side, an end face of the inward projection is flush with a face of a remaining portion of the holding member excluding the recessed portion.

According to the above aspect, the end face of the inward projection is flush with the face of remaining portion of the holding member excluding the recessed portion, thus making it possible for the upper face of the holding member excluding the recessed portion to be in areal contact with the inner surface of the mold during molding of the molded resin portion. This therefore makes it possible to effectively suppress deformation of the holding member.

(4) In an aspect of the above-described reactor, the holding member is provided with a pair of through-holes into which end portions of the inner core portions are inserted, the reactor further includes inward interposing portions that project from peripheral edge portions of the through-holes toward interiors of the winding portions, and the inward interposing portions are inserted between the winding portions and the inner core portions.

According to this aspect, the inner core portions can be positioned due to the end portions of the inner core portions being inserted into the through-holes of the holding members. Also, due to the inward interposing portions of the holding members being inserted between the winding portions and the inner core portion, it is possible to maintain a gap between the winding portions and the inner core portions, and it is possible to position the winding portions.

(5) In an aspect of the reactor described in section (4) above, at the peripheral edge portions of the through-holes of the one holding member, the inward interposing portions are provided only on a side where the recessed portion is provided.

Because the inward projection is provided on the one holding member, even if an attempt is made to move the holding member toward the end faces of the winding portions in the axial direction of the winding portions, the inward projection interferes with the coupling portion, and the coupling portion cannot be arranged in the recessed portion. When the one holding member is arranged at the end faces of the winding portion, if the coupling portion is provided above the axial lines of the winding portions, the inward projection is arranged below the interior space of the coupling portion, and the inward projection is inserted into the inward space of the coupling portion from below. The holding member is then slid relatively upward along the end faces of the winding portions. At this time, if the holding member has the inward interposing portions, the holding member is slid along the end faces of the winding portions in the state where the inward interposing portions have been inserted into the winding portions. If the inward interposing portions are provided so as to extend completely around the peripheral edge portions of the through-holes, then when the inward projection is arranged below the inward space of the coupling portion, the inward interposing portions interfere with the winding portions, and the inward interposing portions cannot be inserted into the winding portions. According to the above aspect, the inward interposing portions are only provided on the side where the recessed portion is provided, that is to say the upper side in the above example, and therefore the holding member can be slid along the end faces of the winding portions in the state where the inward interposing portions have been inserted into the winding portions. Accordingly, the one holding member can be arranged on the end faces of the winding portions.

A concrete example of a reactor according to an embodiment of the present disclosure will be described below with reference to the drawings. Like reference signs in the figures denote like members. Also, portions of the configuration may be exaggerated or simplified in the drawings for convenience in the description, and the configurations are not necessarily shown to scale. Note that the present disclosure is not limited to the following examples, but rather is defined by the claims, and all changes that come within the meaning and range of equivalency of the claims are intended to be embraced therein.

First Embodiment

Figure 2:
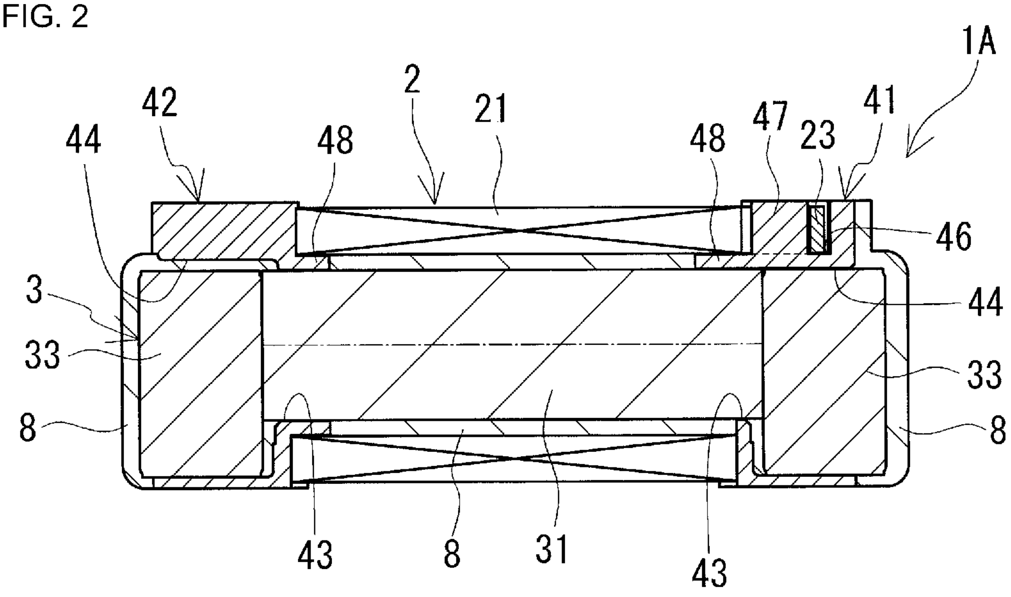
FIG. 2 is a schematic cross-sectional view taken along a line (II)-(II) shown in FIG. 1.
Figure 4:
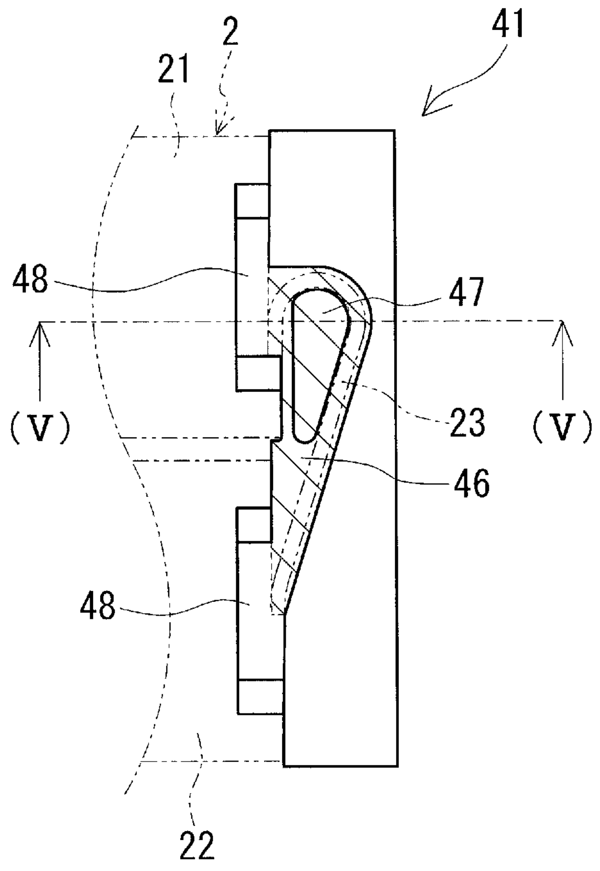
FIG. 4 is a schematic top view of a first holding member.
Figure 5:
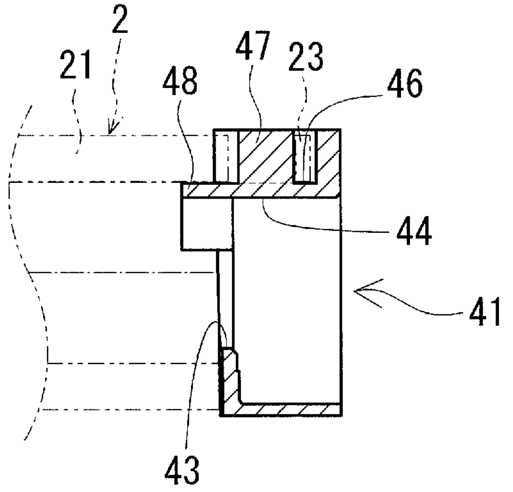
FIG. 5 is a schematic cross-sectional view taken along a line (V)-(V) shown in FIG. 4.

A reactor 1A of a first embodiment will be described below with reference to FIGS. 1 to 9. In the following description of the reactor 1A and constituent members thereof, it is assumed that the reactor 1A is viewed from one lateral side, and regarding the central axis of winding portions 21 and 22 of a coil 2, the side of the central axis where a coupling portion 23 is provided is the upper side, and the side opposite thereto is the lower side. This up-down direction is assumed to be the height direction, that is to say the vertical direction. In FIG. 1, the side toward the paper surface is the upper side, and the side away from the paper surface is the lower side. In FIG. 2, the side toward the top of the paper surface is the upper side, and the side toward the bottom of the paper surface is the lower side. In FIGS. 2 and 5, the central axis is shown by a dashed-dotted line. Also, the length direction is the direction along the axes of the winding portions 21 and 22 of the coil 2, that is to say the left-right direction of the paper surface in FIG. 2. The width direction is the direction in which the winding portions 21 and 22 of the coil 2 are arranged side-by-side, that is to say the up-down direction of the paper surface in FIG. 1. FIG. 2 is a vertical cross-sectional view of the reactor 1A that has been vertically cut along the axial direction of the winding portion 21.

Overview

Figure 3:
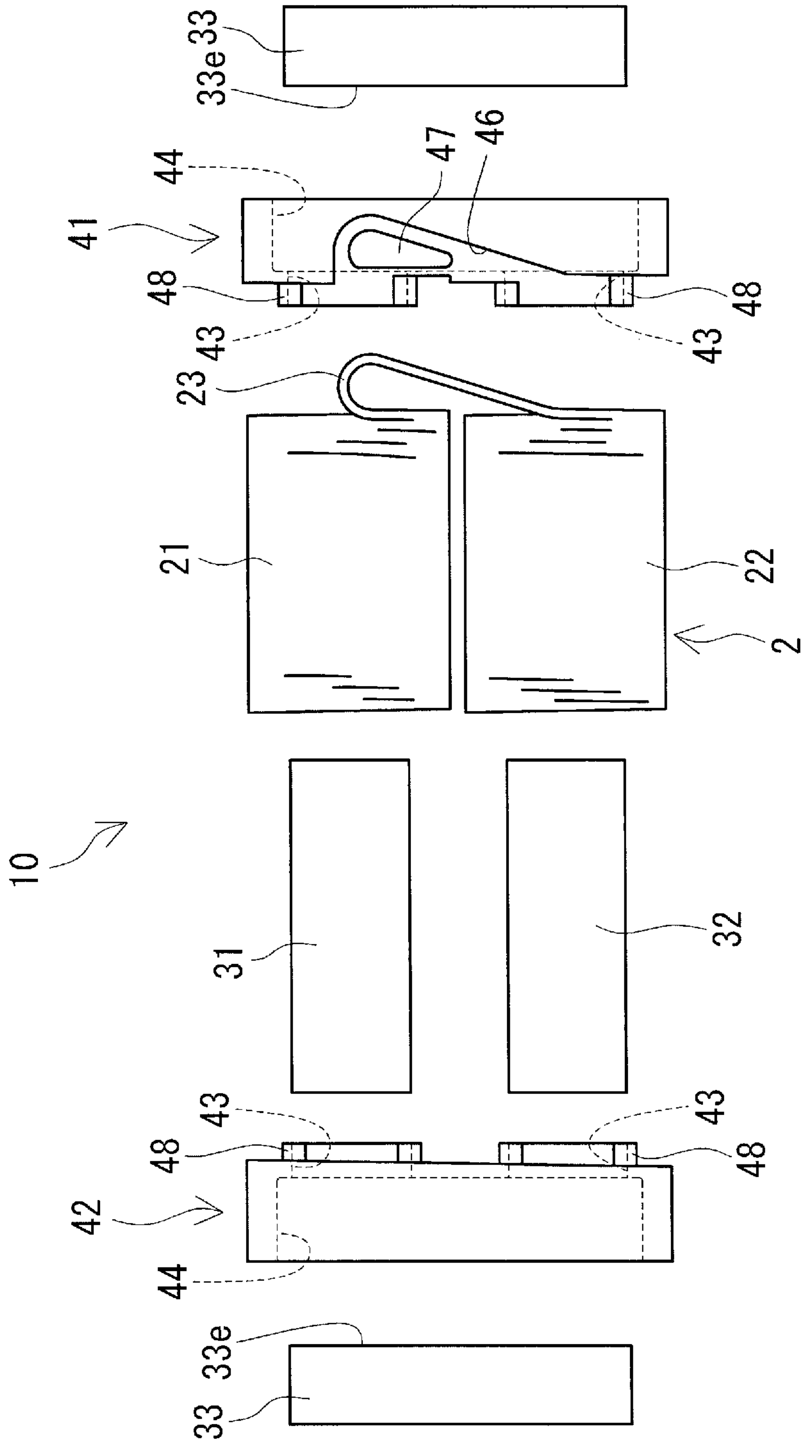
FIG. 3 is a schematic exploded view of an assembly that constitutes the reactor of the first embodiment.

As shown in FIGS. 1 to 3, the reactor 1A of the first embodiment has an assembly 10 shown in FIG. 3 that includes a coil 2, a magnetic core 3, and holding members 41 and 42. As shown in FIG. 1, the coil 2 has a pair of winding portions 21 and 22 and a coupling portion 23. The magnetic core 3 has inner core portions 31 and 32 that are arranged inside the winding portions 21 and 22, and outer core portions 33 that are arranged outside the winding portions 21 and 22. The holding members 41 and 42 are arranged so as to face corresponding end faces of the winding portions 21 and 22. Also, as shown in FIGS. 1 and 2, the reactor 1A includes a molded resin portion 8. The molded resin portion 8 covers at least a portion of the outer peripheral faces of the outer core portions 33 and fills the spaces between the inner peripheral faces of the winding portions 21 and 22 and the inner core portions 31 and 32. In the following description, out of the two holding members 41 and 42, the holding member 41 located on the side corresponding to the coupling portion 23 of the coil 2, that is to say the right side in FIGS. 1 and 2, will sometimes be called the "first holding member", and the other holding member 42 will sometimes be called the "second holding member". One feature of the reactor 1A is that, as shown in FIGS. 3 and 4 as well, the first holding member 41 includes a recessed portion 46 for accommodating the coupling portion 23, and an inward projection 47 for arrangement inside the coupling portion 23. The following describes the configuration of the reactor 1A in detail.

Coil

As shown in FIGS. 1 and 3, the coil 2 includes the pair of winding portions 21 and 22 and the coupling portion 23 that is located on one end side of the winding portions 21 and 22. As shown in FIG. 1, the coupling portion 23 is provided on the right side of the winding portions 21 and 22. The coil 2 is constituted by a single continuous winding wire. The coupling portion 23 is formed by bending back a portion of the winding wire. Specifically, the winding portions 21 and 22 are formed by winding a single continuous winding wire into a spiral, and are arranged in parallel such that their axes are parallel with each other. The winding portions 21 and 22 are connected via the coupling portion 23 that is formed by bending back a portion of the winding wire. The coupling portion 23 in this example is formed by bending back the winding wire into a "J" shape on one end side of the winding portions 21 and 22. The coupling portion 23 projects in the axial direction from end faces of the winding portions 21 and 22. In this example, as shown in FIG. 3, when the coil 2 is viewed from above, a droplet-shaped space is formed between the coupling portion 23 and the end faces of the winding portions 21 and 22, that is to say inside the coupling portion 23. On the other end side of the winding portions 21 and 22, that is to say on the left side in FIG. 1, end portions of the winding wire are drawn out in an appropriate direction and terminal fittings (not shown) are attached to the tips of the end portions. An external apparatus (not shown) such as a battery is connected to the terminal fittings. Note that the end portions of the winding wire are not shown in FIGS. 1 and 3.

As one example, the winding wire is a coated wire that includes a conductor wire and an insulating coating. One example of the constituent material of the conductor wire is copper. One example of the constituent material of the insulating coating is a resin such as polyamide imide. The coated wire may be a coated rectangular wire that has a rectangular cross-sectional shape, or a coated round wire that has a round cross-sectional shape, for example.

The winding portions 21 and 22 are constituted by winding wire portions that have the same specifications, and also have the same shape, size, winding direction, and number of turns. In this example, the winding portions 21 and 22 are quadrangular tube-shaped edgewise coils formed by winding a coated rectangular wire edgewise. Specifically, the winding portions 21 and 22 are shaped as rectangular tubes. Although there are no particular limitations on the shape of the winding portions 21 and 22, they may also be shaped as circular tubes, elliptical tubes, oval tubes, or the like. Also, the winding wire portions that form the winding portions 21 and 22 may have different specifications, and the winding portions 21 and 22 may have different shapes or sizes, for example.

In this example, the end faces of the winding portions 21 and 22 are shaped as rectangular loops in a view along the axial direction. Specifically, the outer peripheral surfaces of the winding portions 21 and 22 each have four flat faces and four corner portions. The corner portions of the winding portions 21 and 22 are rounded.

Magnetic Core

As shown in FIGS. 1 and 3, the magnetic core 3 includes the inner core portions 31 and 32 and the pair of outer core portions 33. The inner core portions 31 and 32 are respectively arranged inside the winding portions 21 and 22. The outer core portions 33 are arranged outside of the winding portions 21 and 22. Axial end portions of the inner core portions 31 and 32 may project out from the winding portions 21 and 22. The outer core portions 33 connect the end portions of the inner core portions 31 and 32 to each other. In this example, the outer core portions 33 are arranged so as to sandwich the inner core portions 31 and 32 from opposite sides. The magnetic core 3 shown in FIG. 1 is configured with an annular shape by connecting the end faces of the inner core portions 31 and 32 to inward end faces 33*e* of the outer core portions 33 as shown in FIG. 3. When the coil 2 is excited, magnetic flux flows through the magnetic core 3, and a closed magnetic circuit is formed.

Inner Core Portion

The inner core portions 31 and 32 are shaped so as to approximately correspond to the inner peripheral shape of the winding portions 21 and 22. Gaps exist between the inner peripheral faces of the winding portions 21 and 22 and the outer peripheral faces of the inner core portions 31 and 32. As shown in FIG. 2, portions of a later-described molded resin portion 8 fill such gaps. In this example, the inner core portions 31 and 32 are shaped as quadrangular columns, or more specifically rectangular columns. The inner core portions 31 and 32 have rectangular end faces in a view along the axial direction. The corner portions of the inner core portions 31 and 32 are rounded so as to conform to the corner portions of the winding portions 21 and 22. The inner core portions 31 and 32 have the same size as each other. Also, in this example, the end portions of the inner core portions 31 and 32 project out from the end faces of the winding portions 21 and 22. The end portions that project out from the winding portions 21 and 22 are also included in the inner core portions 31 and 32. As shown in FIG. 3 as well, the end portions of the inner core portions 31 and 32 that project out from the winding portions 21 and 22 are inserted into through-holes 43 of later-described holding members 41 and 42.

In this example, the inner core portions 31 and 32 are each constituted by one columnar core piece. The core pieces that constitute the inner core portions 31 and 32 have approximately the same length as the total axial length of the winding portions 21 and 22. In other words, the inner core portions 31 and 32 are not provided with gap members. Note that the inner core portions 31 and 32 may each be constituted by multiple core pieces and a gap member provided between adjacent core pieces.

Outer Core Portion

There are no particular limitations on the shape of the outer core portions 33, as long as it is a shape for connecting the end portions of the inner core portions 31 and 32 to each other. As shown in FIG. 3, the outer core portions 33 have inward end faces 33*e* that oppose the end faces of the inner core portions 31 and 32. In this example, the outer core portions 33 are shaped as cuboids. The outer core portions 33 and have the same size as each other. The outer core portions 33 are each constituted by one columnar core piece.

Constituent Materials

The inner core portions 31 and 32 and the outer core portions 33 are constituted by a compact that contains a soft magnetic material. Examples of the soft magnetic material include a metal such as iron or an iron alloy, and a non-metal such as ferrite. The iron alloy is a Fe—Si alloy, a Fe—Ni alloy, or the like. Examples of the compact that contains a soft magnetic material include a powder made of a soft magnetic material, that is to say a powder compact formed by compression molding a soft magnetic powder, and a composite material formed by dispersing a soft magnetic powder in a resin. A composite material is obtained by filling a mold with a raw material obtained by mixing a dispersing a soft magnetic powder in an unsolidified resin, and then allowing the resin to cure. The proportion of soft magnetic powder in the core piece is higher in the powder compact than in the composite material. Magnetic properties of the composite material, such as relative permeability and saturation magnetic flux density, can be easily controlled by adjusting the amount of soft magnetic powder contained in the resin.

The soft magnetic powder is an aggregate of soft magnetic particles. The soft magnetic particles may be coated particles whose surfaces have an insulating coating. Examples of the constituent material of the insulating coating include phosphate and the like. Examples of the resin in the composite material include a thermosetting resin such as epoxy resin, phenol resin, silicone resin, and urethane resin, and a thermoplastic resin such as polyphenylene sulfide (PPS) resin, polyamide (PA) resin, liquid crystal polymer (LCP), polyimide (PI) resin, and fluororesin. Examples of a PA resin include nylon 6, nylon 66, and nylon 9T. The resin of the composite material may contain a filler. If a filler is contained, it is possible to improve the heat dissipation performance of the composite material. For example, the filler may be a non-magnetic powder like an oxide such as alumina, silica, or magnesium oxide, a nitride such as silicon nitride, aluminum nitride, or boron nitride, a ceramic made of a carbide such as silicon carbide, or carbon nanotubes.

The constituent material of the inner core portions 31 and 32 and the constituent material of the outer core portions 33 may be the same as each other or different. For example, the inner core portions 31 and 32 and the outer core portions 33 can be made of a composite material but can contain different soft magnetic powder materials in different amounts. In this example, the inner core portions 31 and 32 are made of a composite material. The outer core portions 33 are constituted by a powder compact. Also, although the magnetic core 3 of this example does not include gap members, there is no limitation to this, and the magnetic core 3 may be configured to include gap members that are arranged between core pieces.

Holding Member

As shown in FIGS. 1 and 3, the holding members 41 and 42 are members arranged so as to face the end faces of the winding portions 21 and 22. The holding members 41 and 42 of this example ensure electrical insulation between the coil 2, which includes the winding portions 21 and 22, and the magnetic core 3, which includes the inner core portions 31 and 32 and the outer core portions 33. Also, the holding members 41 and 42 hold the coil 2 and the magnetic core 3 in a fixed-position state.

Although the holding members 41 and 42 have the same basic configuration, the first holding member 41 is different from the second holding member 42 due to including the recessed portion 46 and the inward projection 47. FIGS. 4 to 7 will also be referenced when describing the holding members 41 and 42. First, the basic configuration that is common to the holding members 41 and 42 will be described. Thereafter, the recessed portion 46 and the inward projection 47 provided in the one holding member 41 will be described.

Figure 6:
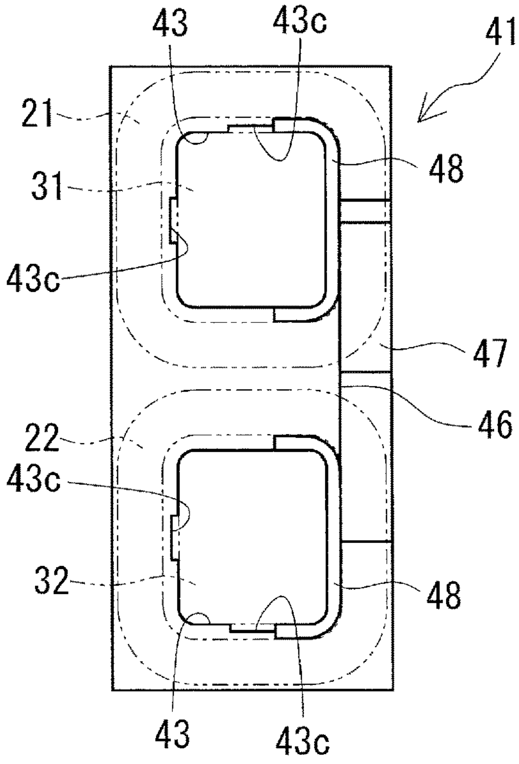
FIG. 6 is a schematic view of the first holding member viewed from the side facing the end faces of winding portions.
Figure 7:
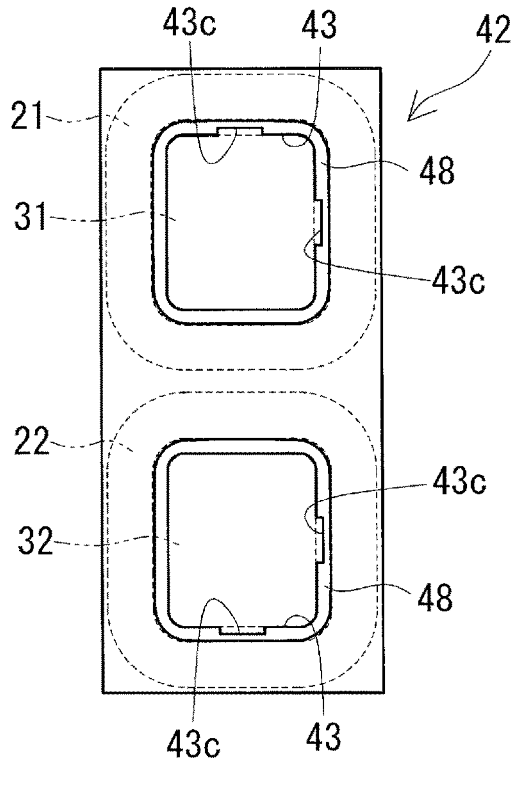
FIG. 7 is a schematic view of a second holding member viewed from the side facing the end faces of the winding portions.

In this example, as shown in FIGS. 6 and 7, the holding members 41 and 42 are shaped as rectangular frames. The outer peripheral surfaces of the holding members 41 and 42 are constituted by substantially flat faces. Note that in FIG. 6, the right side of the paper surface is the upper side of the holding member 41. In FIG. 7, the left side of the paper surface is the upper side of the holding member 42.

Through-Holes

The holding members 41 and 42 ensure electrical insulation between the winding portions 21 and 22 and the outer core portions 33. As shown in FIGS. 1 and 3, the holding members 41 and 42 are arranged between the end faces of the winding portions 21 and 22 and the inward end faces 33*e* of the outer core portions 33. As shown in FIGS. 6 and 7 as well, the holding members 41 and 42 are each provided with a pair of through-holes 43. The end portions of the inner core portions 31 and 32 are inserted into the through-holes 43. The shapes of the through-holes 43 substantially correspond to the outer peripheral shapes of the end portions of the inner core portions 31 and 32. The inner core portions 31 and 32 are held due to the end portions of the inner core portions 31 and 32 being inserted into the through-holes 43. Also, the through-holes 43 are provided such that when the end portions of the inner core portions 31 and 32 have been inserted, as shown in FIGS. 6 and 7, gaps 43*c* are formed in portions between the outer peripheral surfaces of the inner core portions 31 and 32 and the inner peripheral surfaces of the through-holes 43. The gaps 43*c* are in communication with gaps between the inner peripheral surfaces of the winding portions 21 and 22 and the outer peripheral surfaces of the inner core portions 31 and 32.

Fitting Portion

The holding members 41 and 42 each include a fitting portion 44 that is formed so as to surround at least a portion of the outer peripheral surface of the corresponding outer core portion 33. As shown in FIG. 3, the inward end face 33*e* sides of the outer core portions 33 are fitted into the fitting portions 44. In this example, the fitting portions 44 are each provided such that, when the corresponding outer core portion 33 is fitted therein, a gap is formed in a portion between the outer peripheral surface of the outer core portion 33 and the inner peripheral surface of the fitting portion 44. As shown in FIG. 1, these gaps are filled by portions of the later-described molded resin portion 8, and are integrated with the holding members 41 and 42 and the outer core portions 33 by the molded resin portion 8. The holding members 41 and 42 of this example are configured such that the gaps between the outer core portions 33 and the fitting portions 44 are in communication with the gaps 43*c* between the inner core portions 31 and 32 and the through-holes 43 as shown in FIGS. 6 and 7 described above. Due to these gaps being in communication with each other, when the later-described molded resin portion 8 is molded, the resin constituting the molded resin portion 8 can enter the gaps between the winding portions 21 and 22 and the inner core portions 31 and 32. In other words, these gaps function as resin filling holes for filling the winding portions 21 and 22 with the resin constituting the molded resin portion 8.

Inward Interposing Portion

As shown in FIG. 3, the holding members 41 and 42 each also include inward interposing portions 48 that project from peripheral edge portions of the through-holes 43 toward the interiors of the winding portions 21 and 22. The inward interposing portions 48 are inserted between the winding portions 21 and 22 and the inner core portions 31 and 32. As shown in FIGS. 6 and 7, the inward interposing portions 48 maintain gaps between the winding portions 21 and 22 and the inner core portions 31 and 32, and ensure electrical insulation between the winding portions 21 and 22 and the inner core portions 31 and 32.

As shown in FIGS. 6 and 7, in this example, the range in which the inward interposing portion 48 is formed are different between the first holding member 41 and the second holding member 42. As shown in FIG. 6, in the first holding member 41, inward interposing portions 48 are provided only on the side where the recessed portions 46 are provided. Specifically, as shown in FIGS. 5 and 6, in the first holding member 41, the inward interposing portions 48 are provided only on the upper side of the peripheral edge portions of the through-holes 43. When the first holding member 41 is viewed from the side that faces the end faces of the winding portions 21 and 22 shown in FIG. 3, the inward interposing portions 48 are shaped like the symbol "]" as shown in FIG. 6. The inward interposing portions 48 of the first holding member 41 cover the upper faces of the end portions of the inner core portions 31 and 32, as well as upper portions of the side faces thereof. On the other hand, as shown in FIG. 7, in the second holding member 42, the inward interposing portions 48 are provided so as to completely surround the peripheral edge portions of the through-holes 43. When the second holding member 42 is viewed from the side that faces the end faces of the winding portions 21 and 22 shown in FIG. 3, the inward interposing portions 48 are shaped like rectangular frames as shown in FIG. 7. The inward interposing portions 48 of the second holding member 42 completely surround the outer peripheral surfaces of the end portions of the inner core portions 31 and 32.

As described above, the inner core portions 31 and 32 are positioned due to the end portions of the inner core portions 31 and 32 being inserted into the through-holes 43 of the holding members 41 and 42. Also, as shown in FIG. 3, the outer core portions 33 are positioned due to the inward end face 33*e* sides of the outer core portions 33 being fitted into the fitting portions 44 of the holding members 41 and 42. Furthermore, the winding portions 21 and 22 are positioned by the inward interposing portions 48. As a result, the coil 2, which includes the winding portions 21 and 22, and the magnetic core 3, which includes the inner core portions 31 and 32 and the outer core portions 33, are held in a fixed position state by the holding members 41 and 42.

Constituent Materials

The holding members 41 and 42 are made of an electrically insulating material. Resins are one typical example of an electrically insulating material. Specific examples include a thermosetting resin such as epoxy resin, phenol resin, silicone resin, urethane resin, and unsaturated polyester resin, and a thermoplastic resin such as PPS resin, PA resin, LCP, PI resin, fluororesin, polytetrafluoroethylene (PTFE) resin, polybutylene terephthalate (PBT) resin, and acrylonitrile-butadiene-styrene (ABS) resin. The resin making up the holding members 41 and 42 may contain a filler. If a filler is contained, it is possible to improve the heat dissipation performance of the holding members 41 and 42. Fillers similar to those used in the composite material described above can be used. The holding members 41 and 42 of this example are molded objects obtained through injection molding, and are made of PPS resin.

Recessed Portion

As shown in FIGS. 4 and 5, the recessed portion 46 for accommodating the coupling portion 23 is formed in the upper portion of the first holding member 41 where the coupling portion 23 is arranged. As shown in FIGS. 5 and 6, the bottom face of the recessed portion 46 is a flat face. In this example, as shown in FIG. 4, the inner peripheral face of the recessed portion 46 that faces the coupling portion 23 is formed so as to extend along the outline of the coupling portion 23. Specifically, in a view of the holding member 41 from above, the shape of the recessed portion 46 substantially corresponds to the external shape of the coupling portion 23. As shown in FIGS. 5 and 6, the thickness of the portion of the holding member 41 where the recessed portion 46 is formed (i.e., the gap between the inner peripheral surface of the through-hole 43 and the bottom face of the recessed portion 46) is smaller than the thickness of the portion where the recessed portion 46 is not formed (i.e., the gap between the inner peripheral surface of the through-hole 43 and the upper face of the holding member 41).

Inward Projection

As shown in FIGS. 4 and 5, the recessed portion 46 of the first holding member 41 is provided with an inward projection 47 that is arranged between the coupling portion 23 and the end faces of the winding portions 21 and 22, that is to say on the inward side of the coupling portion 23. In other words, the inward projection 47 fits into the interior space of the coupling portion 23. As shown in FIG. 5, the inward projection 47 projects out from the bottom face of the recessed portion 46. The inward projection 47 is integrated with the holding member 41. As shown in FIGS. 5 and 6, the end face of the inward projection 47 is a flat face. In this example, as shown in FIG. 4, when the holding member 41 is viewed from above, the inward projection 47 is shaped as a droplet that substantially corresponds to the shape of the interior space of the coupling portion 23. As shown in FIGS. 5 and 6, the thickness of the portion of the holding member 41 where the inward projection 47 is formed (i.e., the gap between the inner peripheral surface of the through-hole 43 and the end face of the inward projection 47) is larger than the thickness of the portion where the recessed portion 46 is formed.

Inward Projection Area Ratio

As shown in FIG. 4, in a plan view of the face of the holding member 41 on the recessed portion 46 side, that is to say the upper face, the ratio of the area of the inward projection 47 to the area of the recessed portion 46 is greater than or equal to 50%, for example. Hereinafter, this area ratio will be called the "inward projection area ratio". Here, the area of the recessed portion 46 is the area of the region enclosed by the inner peripheral surface of the recessed portion 46 and the end faces of the winding portions 21 and 22 when the holding member 41 is arranged on the end faces of the winding portions 21 and 22. This region is shown by hatching in FIG. 4. The area of the recessed portion 46 includes the area of the inward projection 47. The area of the inward projection 47 is the area of the end face of the inward projection 47 in a plan view of the upper face of the holding member 41. It is preferable that the area ratio of the inward projection 47 is greater than or equal to 55%, or furthermore greater than or equal to 60% of the area of the recessed portion 46. Although there are no particular limitations on the upper limit, the area ratio of the inward projection 47 is less than or equal to 80%, for example.

Inward Projection Height

As shown in FIG. 5, the height of the inward projection 47 is greater than or equal to the height of the coupling portion 23, that is to say the width of the winding wire that constitutes the winding portions 21 and 22 of the coil 2, for example. The height of the inward projection 47 refers to the distance from the bottom face of the recessed portion 46 to the end face of the inward projection 47. The height of the coupling portion 23 is the dimension thereof in a direction that is orthogonal to both the arrangement direction and the axial direction of the winding portions 21 and 22. The height of the coupling portion 23 is equivalent to the length of the gap between the inner peripheral surfaces and the outer peripheral surfaces of the winding portions 21 and 22. In this example, as shown in FIG. 5, the height of the inward projection 47 is substantially equivalent to the height of the coupling portion 23, but the inward projection 47 is slightly higher than the coupling portion 23. Also, the inward projection 47 has a uniform cross-section in the projecting direction thereof, that is to say the height direction.

Furthermore, in this example, as shown in FIGS. 5 and 6, the end face of the inward projection 47 that makes up a portion of the upper face of the holding member 41 is substantially flush with the face of the remaining portion excluding the recessed portion 46. For this reason, the upper face of the holding member 41 where the recessed portion 46 is provided is substantially flat, with the exception of the recessed portion 46.

Molded Resin Portion

As shown in FIGS. 1 and 2, the molded resin portion 8 covers at least a portion of the outer peripheral surfaces of the outer core portions 33, and fills the spaces between the inner peripheral surfaces of the winding portions 21 and 22 and the outer peripheral surfaces of the inner core portions 31 and 32. Due to this molded resin portion 8, the inner core portions 31 and 32 and the outer core portions 33 are held in an integrated state, and the coil 2, which includes the winding portions 21 and 22, and the magnetic core 3, which includes the inner core portions 31 and 32 and the outer core portions 33, are integrated with each other. For this reason, the coil 2 and the magnetic core 3 can be handled as a single object. Also, the outer core portions 33 and the holding members 41 and 42 are integrated with each other by the molded resin portion 8. Specifically, in this example, due to the molded resin portion 8, the coil 2, the magnetic core 3, and the holding members 41 and 42 are integrated with each other, and the assembly 10 shown in FIG. 3 can be handled as a single object. Note that the outer peripheral surfaces of the winding portions 21 and 22 are not covered by the molded resin portion 8, and are exposed from the molded resin portion 8.

It is sufficient that the molded resin portion 8 can hold the inner core portions 31 and 32 and the outer core portions 33 in an integrated state. For this reason, it is sufficient that the molded resin portion 8 is formed so as to be able to cover at least the outer peripheral surfaces of the end portions of the inner core portions 31 and 32. In other words, the molded resin portion 8 is not required to reach the central portions of the inner core portions 31 and 32 in the axial direction. In view of the functionality of the molded resin portion 8 for holding the inner core portions 31 and 32 and the outer core portions 33 in an integrated state, it is sufficient that the molded resin portion 8 is formed in a range up to the vicinity of the end portions of the inner core portions 31 and 32. Of course, the molded resin portion 8 may reach the central portions of the inner core portions 31 and 32 in the axial direction. In this case, the molded resin portion 8 is formed so as to cover the full length of the outer peripheral surfaces of the inner core portions 31 and 32, and extends from the one outer core portion 33 to the other outer core portion 33. In this example, the molded resin portion 8 fills the gaps between the inner peripheral surfaces of the winding portions 21 and 22 and the outer peripheral surfaces of the inner core portions 31 and 32 over the entire length in the axial direction of the winding portions 21 and 22 as shown in FIG. 2.

Constituent Materials

The molded resin portion 8 of this example is molded by injection molding. The resins that can be used to form the molded resin portion 8 are similar to those previously described for forming the holding members 41 and 42. The molded resin portion 8 may contain any of the previously described fillers. In this example, the molded resin portion 8 is formed using PPS resin.

Manufacturing Method

The following describes an example of a method for manufacturing the above-described reactor 1A. This reactor manufacturing method mainly includes a step for producing the assembly and a step for molding the molded resin portion.

As shown in FIG. 3, in the step for producing the assembly, the assembly 10 is produced by assembling together the coil 2, the magnetic core 3, and the holding members 41 and 42.

Figure 8:
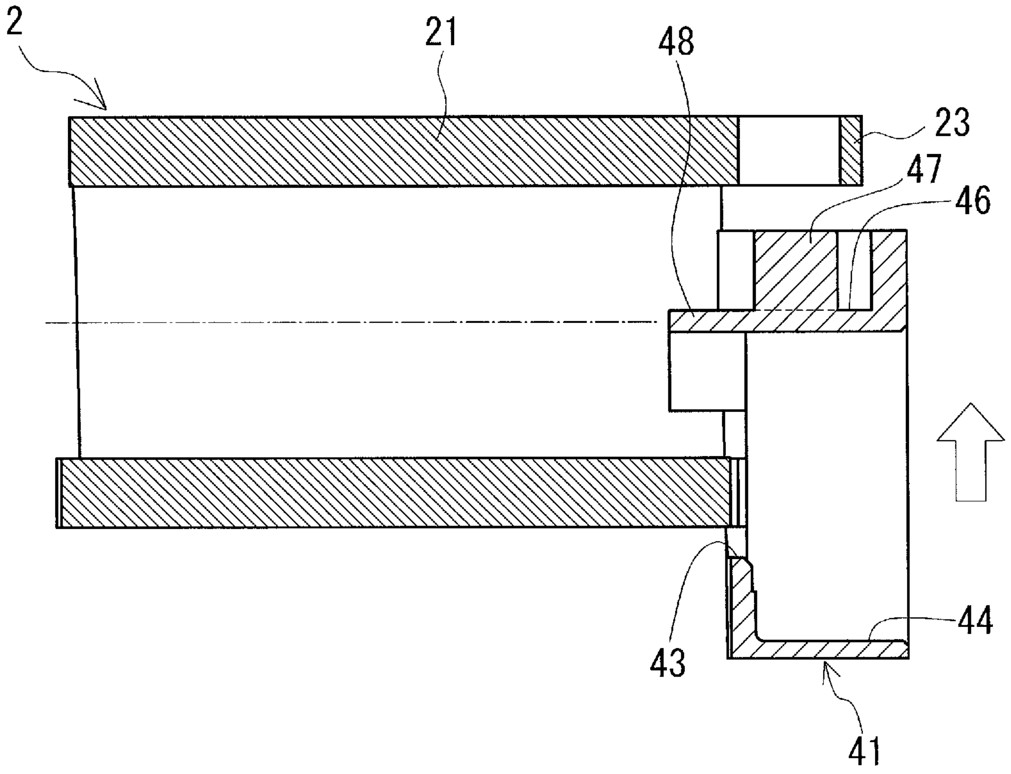
FIG. 8 is a diagram illustrating a method of disposing the first holding member on the end faces of the winding portions.
Figure 9:
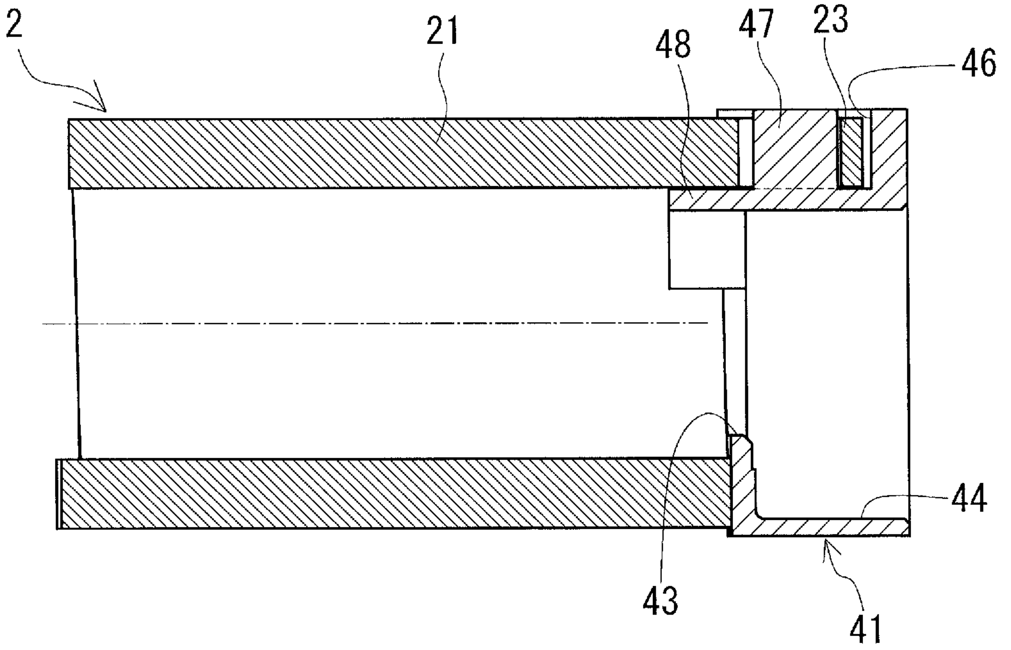
FIG. 9 is a diagram illustrating a state in which the first holding member has been disposed on the end faces of the winding portions.

The assembly 10 is assembled as follows. The holding members 41 and 42 are respectively arranged so as to face the end faces of the winding portions 21 and 22 of the coil 2. In the case of the first holding member 41 on the side where the coupling portion 23 of the coil 2 is arranged, as shown in FIG. 8, the holding member 41 is arranged on the end faces on one side of the winding portions 21 and 22 such that the inward projection 47 is located below the interior space of the coupling portion 23, and the inward interposing portions 48 are inserted into the winding portions 21 and 22. Note that in FIG. 8, out of the two winding portions 21 and 22, the winding portion 21 is shown in a state of being vertically cut along the axial direction, and the winding portion 22 is not shown. Next, the holding member 41 is slid relatively upward along the end faces of the winding portions 21 and 22 so as to insert the inward projection 47 from below the interior space of the coupling portion 23. In FIG. 8, the white arrow indicates the sliding direction of the holding member 41. Accordingly, as shown in FIG. 9, the coupling portion 23 is accommodated in the recessed portion 46 of the holding member 41, and the inward projection 47 is fitted into the interior space of the coupling portion 23, and therefore the first holding member 41 is arranged on the end faces on one side of the winding portions 21 and 22.

After the holding member 41 is arranged at the one end side of the winding portion 21 and 22, the outer core portions 33 are fitted into the fitting portions 44 of the holding member 41. In this state, the inner core portions 31 and 32 are inserted into the winding portions 21 and 22 from the other end side of the winding portions 21 and 22. Thereafter, the second holding member 42 is moved in the axial direction of the winding portions 21 and 22 so as to be arranged at the end faces on the other side of the winding portions 21 and 22, and the outer core portions 33 are fitted into the fitting portions 44 of the holding member 42. The end portions of the inner core portions 31 and 32 are inserted into the through-holes 43 of the holding members 41 and 42, and the outer core portions 33 are arranged at the ends of the inner core portions 31 and 32. Accordingly, the end faces of the inner core portions 31 and 32 are connected to the end faces 33*e* of the outer core portions 33, thus obtaining the annular magnetic core 3 that includes the inner core portions 31 and 32 and the outer core portions 33 as shown in FIG. 1. The assembly 10 that includes the coil 2, the magnetic core 3, and the holding members 41 and 42 is assembled as described above. The coil 2 and the magnetic core 3 are held in a fixed position state by the holding members 41 and 42.

In the step for molding the molded resin portion, the outer peripheral surfaces of the outer core portions 33 are at least partially covered with the resin, and the resin fills the spaces between the inner peripheral surfaces of the winding portions 21 and 22 and the inner core portions 31 and 32. The molded resin portion 8 is thus molded as shown in FIG. 2.

The assembly 10 is arranged in a mold, and resin is injected into the mold from the outer core portion 33 side of the assembly 10. For example, the resin is injected from the side opposite to the side where the inner core portions 31 and 32 of the outer core portions 33 are arranged, and the outer peripheral surfaces of the outer core portions 33 are covered with the resin. At this time, a portion of the resin passes through the previously described resin filling hole that are formed in the holding members 41 and 42 as described with reference to FIGS. 6 and 7, that is to say passes through the gaps between the outer core portions 33 and the fitting portions 44 and the gaps 43*c* between the inner core portions 31 and 32 and the through-holes 43, and fills the spaces between the winding portions 21 and 22 and the inner core portions 31 and 32. Thereafter, the resin is allowed to cure, thus obtaining the integrated molded resin portion 8. Accordingly, the coil 2, the magnetic core 3, and the holding members 41 and 42 can be integrated with each other by the molded resin portion 8. The reactor 1A shown in FIGS. 1 and 2 can be manufactured as described above.

The resin may fill the winding portions 21 and 22 by flowing from one of the outer core portions 33 toward the other outer core portion 33, or may fill the winding portions 21 and 22 by flowing from both outer core portion 33 sides. In this example, the outer core portions 33 are covered with resin through bidirectional filling in which the resin is injected from both outer core portion 33 sides, and the resin fills the gaps between the inner peripheral surfaces of the winding portions 21 and 22 and the outer peripheral surfaces of the inner core portions 31 and 32.

In the present embodiment, as shown in FIGS. 4 and 5, at the upper portion of the first holding member 41, the inward projection 47 is integrally provided inside the recessed portion 46 for accommodating the coupling portion 23. Due to the existence of the inward projection 47 in the recessed portion 46, it is possible to reduce the size of the region of the holding member 41 that has a reduced thickness due to the recessed portion 46. This therefore makes it possible to improve the strength of the portion of the holding member 41 where the recessed portion 46 is formed. Accordingly, when the molded resin portion 8 is molded, it is possible to suppress deformation of the portion of the holding member 41 where the recessed portion 46 is formed, and it is possible to suppress the leakage of resin caused by deformation of the holding member 41.

Also, due to the area ratio of the inward projection 47 being greater than or equal to 50%, it is possible to further improve the strength of the portion of the holding member 41 where the recessed portion 46 is formed. Accordingly, it is possible to further suppress deformation of the portion of the holding member 41 where the recessed portion 46 is formed during molding of the molded resin portion 8.

Furthermore, in this example, as shown in FIGS. 5 and 6, the end face of the inward projection 47 is flush with the surface of the remaining portion of the holding member 41 excluding the recessed portion 46, and the upper face of the holding member 41 excluding the recessed portion 46 is a flat face. For this reason, it is possible for the upper face of the holding member 41 to be in areal contact with the inner surface of the mold during molding of the molded resin portion 8. This therefore makes it possible to effectively suppress deformation of the holding member 41.

In this example, the inward interposing portions 48 of the holding member 41 are provided only on the upper sides of the peripheral edge portions of the through-holes 43. For this reason, as described with reference to FIG. 8, in the state where the inward projection 47 is located at the lower side of the coupling portion 23 and the inward interposing portions 48 have been inserted into the winding portions 21 and 22, the holding member 41 can be slid along the end faces of the winding portions 21 and 22. This therefore makes it possible to arrange the holding member 41 on the end faces of the winding portions 21 and 22.

Effects

The following are actions and effects of the reactor 1A of the first embodiment.

The one holding member 41 on the side where the coupling portion 23 of the coil 2 is arranged includes the inward projection 47 in the recessed portion 46 for accommodating the coupling portion 23. Due to the inward projection 47, it is possible to reduce the size of the region of the holding member 41 that has a reduced thickness due to the formation of the recessed portion 46, thus making it possible to improve the strength of the portion of the holding member 41 where the recessed portion 46 is formed. Accordingly, when the molded resin portion 8 is molded, it is possible to suppress deformation of the portion of the holding member 41 where the recessed portion 46 is formed, and it is possible to suppress the leakage of resin caused by deformation of the holding member 41.

Application

The reactor 1A of the first embodiment is applicable to a component of a circuit for performing voltage step-up or step-down. The reactor 1A is also applicable to a constituent component of various types of convertors and power conversion apparatuses, for example. Examples of converters include in-vehicle converters mounted in vehicles such as hybrid automobiles, plug-in hybrid automobiles, electric automobiles, and fuel cell automobiles, typically DC-DC converters, and air conditioner converters. For example, the reactor 1A is installed in an installation target (not shown) such as a converter case.

Variations

The following are examples of variations of the reactor 1A of the first embodiment described above.

(1) A case for housing the reactor 1A may be provided. Housing the reactor 1A in a case makes it possible for the assembly 10 that includes the coil 2, the magnetic core 3, and the holding members 41 and 42 to be mechanically protected and also protected from the external environment. Protection from the external environment improves the corrosion resistance of the assembly 10. The case can be made of a metallic material, for example. A metal case has a relatively high thermal conductivity, and heat from the assembly 10 can be easily dissipated via the case to the outside.

This therefore contributes to an improvement in the heat dissipation performance of the reactor 1A.

For example, the case includes a bottom plate portion on which the reactor 1A is placed, side wall portions that surround the reactor 1A, and an opening that is formed on the side opposite to the bottom plate portion. A housing space for the reactor 1A is formed in the case by the bottom plate portion and the side wall portions. The case is a bottomed tubular container that has an opening on the side opposite to the bottom plate portion. The bottom plate portion and the side wall portions may be integrated, or may be formed separate from each other. In the case where the bottom plate portion and the side wall portions are separate members, they can be joined using screws, an adhesive, or the like. The height of the side wall portions, that is to say the height of the case, can be set higher than the upper end of the reactor 1A when housed in the case. Here, the bottom plate portion side of the case is the lower side, and the opening side opposite thereto is the upper side. The direction along the up-down direction is the height direction (i.e., depth direction) of the case. The case can be shaped such that the side wall portions form a rectangular frame, and the opening is rectangular in a view from above, for example.

It is preferable that the constituent material of the case is a non-magnetic metal. Examples of the non-magnetic metal include aluminum and an alloy thereof, magnesium and an alloy thereof, copper and an alloy thereof, silver and an alloy thereof, and austenitic stainless steel. The metal case can be manufactured by die casting.

(2) In the case where the above-described case is provided, a sealing resin portion that seals at least a portion of the reactor 1A may be provided in the case. Protection of the assembly 10 can be achieved with the sealing resin portion. Also, portions of the sealing resin portion exist between the coil 2 and the case. For example, portions of the sealing resin portion exist between the winding portions 21 and 22 and the side wall portions of the case. Accordingly, heat from the coil 2 can be transmitted to the case via the sealing resin portions, and the heat dissipation performance of the assembly 10 can be improved.

The sealing resin portion may be made of, for example, a thermosetting resin such as epoxy resin, urethane resin, silicone resin, or unsaturated polyester resin, or a thermoplastic resin such as PPS resin. The higher the thermal conductivity of the sealing resin portion is, the more preferable it is. This is because heat from the coil 2 can be transmitted to the case more easily. The thermal conductivity of the sealing resin portion is preferably 1 W/m·K or more, further preferably 1.5 W/m·K or more, and particularly preferably 2 W/m·K or more. The sealing resin portion may contain any of the previously described fillers.

(3) The reactor 1A may be arranged horizontally, vertically, or upright. Being disposed horizontally means being arranged such that the arrangement direction of the winding portions 21 and 22 of the coil 2 is parallel with the surface of the installation target. Being arranged vertically means being disposed such that the arrangement direction of the winding portions 21 and 22 of the coil 2 is orthogonal to the surface of the installation target. Being disposed upright means being arranged such that the axial direction of the winding portions 21 and 22 of the coil 2 is orthogonal to the surface of the installation target. In the case where the reactor 1A is housed in the above-described case, the bottom plate portion of the case is the installation target.

In the case where the reactor 1A is arranged vertically, the installation area of the reactor 1A on the installation target can be smaller than in the case of being arranged horizontally. This is because in general, the length of the assembly 10 along a direction orthogonal to both the arrangement direction and the axial direction of the winding portions 21 and 22 is shorter than the length of the assembly 10 along the arrangement direction of the winding portions 21 and 22. Similarly, also in the case where the reactor 1A is arranged upright, the installation area of the reactor 1A on the installation target can be smaller than in the case of being arranged horizontally. This is because in general, the length of the assembly 10 along a direction orthogonal to both the arrangement direction and the axial direction of the winding portions 21 and 22 is shorter than the length of the assembly 10 along the axial direction of the winding portions 21 and 22. Accordingly, in the case of vertical or upright arrangement, the amount of space need for arrangement of the reactor 1A can be made smaller than in the case of horizontal arrangement. Also, in the case of being housed in a case, compared with horizontal arrangement, vertical and upright arrangement make it is possible to ensure a large area where the winding portions 21 and 22 and the case face each other, thus allowing the case to be efficiently used as a heat dissipation path. For this reason, heat can be easily dissipated from the coil 2 to the case, and it is possible to further improve the heat dissipation performance. If the length of the assembly 10 along the axial direction of the winding portions 21 and 22 is longer than the length of the assembly 10 along the arrangement direction of the winding portions 21 and 22, the amount of installation space needed by the reactor 1A can be smaller in the case of upright arrangement than in the case of vertical arrangement.

(4) An adhesion layer may be provided between the reactor 1A and the installation target. This therefore makes it possible to strongly fix the reactor 1A to the installation target. For example, the adhesion layer can be formed on the surface of the reactor 1A that faces the installation target when the reactor 1A is attached to the installation target. In the case where the reactor 1A is housed in the above-described case, the bottom plate portion of the case is the installation target.

The adhesion layer can be made of an electrically insulating resin. Examples of the electrically insulating resin that forms the adhesion layer include a thermosetting resin such as epoxy resin, silicone resin, or unsaturated polyester resin, and a thermoplastic resin such as PPS resin or LCP. The adhesion layer may contain any of the previously described fillers. The adhesion layer may be formed using a commercially available adhesive sheet, or may be formed by applying a commercially available adhesive.

The invention claimed is:

1. A reactor comprising:

a coil including a pair of winding portions arranged in parallel via a coupling portion;

a magnetic core including inner core portions arranged inside the winding portions and a pair of outer core portions arranged outside the winding portions;

a pair of holding members arranged so as to face end faces of the winding portions; and a molded resin portion that covers at least a portion of outer peripheral surfaces of the outer core portions and fills spaces between inner peripheral surfaces of the winding portions and the inner core portions, wherein the coil is constituted by a single continuous winding wire, the coupling portion is formed by bending back a portion of the winding wire, and one of the holding members on a side on which the coupling portion is arranged includes a recessed portion that houses the coupling portion and an inward projection that is arranged inside the coupling portion.

2. The reactor according to claim 1, wherein in plan view of a face of the one holding member on a recessed portion side, a ratio of the area of the inward projection to the area of the recessed portion is greater than or equal to 50%.

3. The reactor according to claim 1, wherein at a face of the one holding member on a recessed portion side, an end face of the inward projection is flush with a face of a remaining portion of the holding member excluding the recessed portion.

4. The reactor according to claim 1, wherein the holding member is provided with a pair of through-holes into which end portions of the inner core portions are inserted, the reactor further comprises inward interposing portions that project from peripheral edge portions of the through-holes toward interiors of the winding portions, and the inward interposing portions are inserted between the winding portions and the inner core portions.

5. The reactor according to claim 4, wherein at the peripheral edge portions of the through-holes of the one holding member, the inward interposing portions are provided only on a side where the recessed portion is provided.

6. The reactor according to claim 2, wherein at a face of the one holding member on a recessed portion side, an end face of the inward projection is flush with a face of a remaining portion of the holding member excluding the recessed portion.

7. The reactor according to claim 2, wherein the holding member is provided with a pair of through-holes into which end portions of the inner core portions are inserted, the reactor further comprises inward interposing portions that project from peripheral edge portions of the through-holes toward interiors of the winding portions, and the inward interposing portions are inserted between the winding portions and the inner core portions.

8. The reactor according to claim 3, wherein the holding member is provided with a pair of through-holes into which end portions of the inner core portions are inserted, the reactor further comprises inward interposing portions that project from peripheral edge portions of the through-holes toward interiors of the winding portions, and the inward interposing portions are inserted between the winding portions and the inner core portions.

* * * * *